US005133480A

United States Patent [19]

Matsumoto et al.

[11] Patent Number: 5,133,480

[45] Date of Patent: Jul. 28, 1992

[54] LIQUID DISPENSING APPARATUS

[75] Inventors: Nobuo Matsumoto, Tokyo; Jiro Yakuwa, Kanagawa; Kazhide Kitamura, Tokyo, all of Japan

[73] Assignee: Seicho Kogyo Co., Ltd., Tokyo, Japan

[21] Appl. No.: 690,339

[22] Filed: Apr. 26, 1991

Related U.S. Application Data

[63] Continuation of Ser. No. 449,140, Dec. 13, 1989, abandoned, which is a continuation of Ser. No. 175,271, Mar. 30, 1988, abandoned.

[30] Foreign Application Priority Data

Apr. 3, 1987 [JP] Japan ................................ 62-80891

[51] Int. Cl.$^5$ .......................... B67D 5/08; G06F 7/08

[52] U.S. Cl. .......................................... 222/2; 222/14; 222/30; 222/399; 235/381; 194/210

[58] Field of Search ...................... 222/23, 30, 36–38, 222/2, 14, 129.3, 129.1, 399, 397; 235/381, 491; 194/210

[56] References Cited

U.S. PATENT DOCUMENTS

| | | | |
|---|---|---|---|
| 2,977,024 | 3/1961 | Harris | 222/2 |
| 3,130,869 | 4/1964 | Phillips et al. | 222/26 |
| 3,603,481 | 9/1971 | Dilger et al. | 222/30 |
| 3,688,947 | 9/1972 | Reichenberger | 222/129.3 X |
| 3,814,285 | 6/1974 | Craig | 222/2 |
| 3,891,830 | 6/1975 | Goldman | 222/2 X |
| 4,027,783 | 6/1977 | Branch et al. | 222/129.3 X |
| 4,124,109 | 11/1978 | Bissell et al. | 194/210 |
| 4,313,168 | 1/1982 | Stephens et al. | 222/30 |
| 4,319,128 | 3/1982 | Dow, Jr. et al. | 222/30 |
| 4,361,754 | 11/1982 | Hoskinson et al. | 235/381 |
| 4,469,150 | 9/1984 | Grimaldi | 222/30 |
| 4,487,333 | 12/1984 | Pounder et al. | 222/14 X |
| 4,702,396 | 10/1987 | Gwiazda | 222/399 X |

FOREIGN PATENT DOCUMENTS

| | | | |
|---|---|---|---|
| 3507707 | 9/1986 | Fed. Rep. of Germany | 235/381 |
| 48574 | 3/1985 | Japan | 235/381 |
| 2094044 | 9/1982 | United Kingdom | 235/491 |

*Primary Examiner*—Robert P. Olszewski
*Assistant Examiner*—Steven M. Reiss
*Attorney, Agent, or Firm*—Oblon, Spivak, McClelland, Maier & Neustadt

[57] ABSTRACT

A liquid dispensing apparatus capable of providing a customer with a desired amount of liquid depending on data recorded in a memory card purchased in place of liquor in the unit of a bottle. The apparatus includes a flowmeter to generate a signal representing the amount of liquid supplied, a card read/write device in which a reloadable memory card is inserted, and a CPU connected to the card read/write device and flowmeter. The CPU receives data of the memory card read by the card read/write device to open a valve depending on the data to dispense a desired amount of liquid and receives a signal from the flowmeter to operate the amount of liquid dispensed and close the valve. The card read/write device also carries out write of new data based on the operation of the CPU.

11 Claims, 3 Drawing Sheets

LIQUID DISPENSING APPARATUS

This application is a continuation of application Ser. No. 449,140 filed on Dec. 13, 1989, now abandoned, which is a continuation of application Ser. No. 175,271, filed Mar. 30, 1988, now abandoned.

BACKGROUND OF THE INVENTION

1. Field of the Invention

This invention relates to a liquid dispensing apparatus, and more particularly to a liquid dispensing apparatus which is adapted to dispense a desired amount of liquid therefrom to a vessel by means of a memory card recording the amount of liquid purchased and the like therein by magnetism or color and reload the card after the dispensing.

2. Description of the Prior Art

In general, a restaurant employs a so-called bottle keeping system that liquor such as whiskey or the like is sold to a customer in the unit of a bottle and when liquor is left in the bottle, the restaurant keeps it. However, the bottle keeping system cannot be applied to restaurants other than a restaurant which sold liquor to a customer. Also, a term for which a restaurant keeps a bottle is generally determined to be short. In addition, a restaurant is required to secure a space necessary to keep bottles therein. Further, the bottle keeping system has an additional disadvantage of causing the quality of liquor in a bottle kept to be deteriorated during its keeping.

SUMMARY OF THE INVENTION

The present invention has been made in view of the foregoing disadvantages of the prior art.

Accordingly, it is an object of the present invention to provide a liquid dispensing apparatus which is capable of providing a customer with a desired amount of liquid depending on data recorded in a memory card.

It is another object of the present invention to provide a liquid dispensing apparatus which is capable of commonly providing a customer with a desired amount of liquid in various restaurants so long as they are equipped with the apparatus.

It is a further object of the present invention to provide a liquid dispensing apparatus which is capable of permitting a customer to have a desired amount of liquid whenever his memory card is effective.

It is still another object of the present invention to provide a liquid dispensing apparatus which is capable of accomplishing the above-described objects with a simple structure.

In accordance with the present invention, a liquid dispensing apparatus is provided. The apparatus has a valve arranged at a flow passage led out from a liquid tank in which liquid is stored and a flowmeter provided at said flow passage to generate a signal proportional to the amount of liquid supplied through said flow passage. Also, the apparatus includes a card read/write device in which a reloadable memory card having data necessary for dispensing liquid stored therein is inserted. The card read/write device is adapted to carry out read and write of data with respect to the reloadable memory card. Further, the apparatus includes a central processing unit (hereinafter referred to as "CPU") connected to the card read/write device and flowmeter for receiving data from the card read/write device to determine opening of the valve and receiving the signal from the flowmeter to operate the amount of liquid passing through the flow passage, to thereby close the valve when a desired amount of liquid is supplied. The card read/write device carries out write of new data based on the operation of the CPU.

In the present invention constructed as described above, a restaurant sells a customer a reloadable memory card having a predetermined amount of liquid stored therein in place of directly selling him a bottle of liquid. Liquid to be sold a customer is stored in a liquid tank for every kind. The memory card may be of the type capable of recording data therein by magnetism or color. When the memory card is inserted in the card read/write device, the device carries out read of data stored in the card to operate the CPU, so that a desired amount of liquid may be dispensed depending on the data. When the dispensing is completed, the apparatus causes the memory card to store new data.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like parts throughout; wherein.

DETAILED DESCRIPTION OF THE PREFERRED EMBODIMENT

Now, a liquid dispensing apparatus according to the present invention will be described hereinafter with reference to the accompanying drawings.

Figure 1:
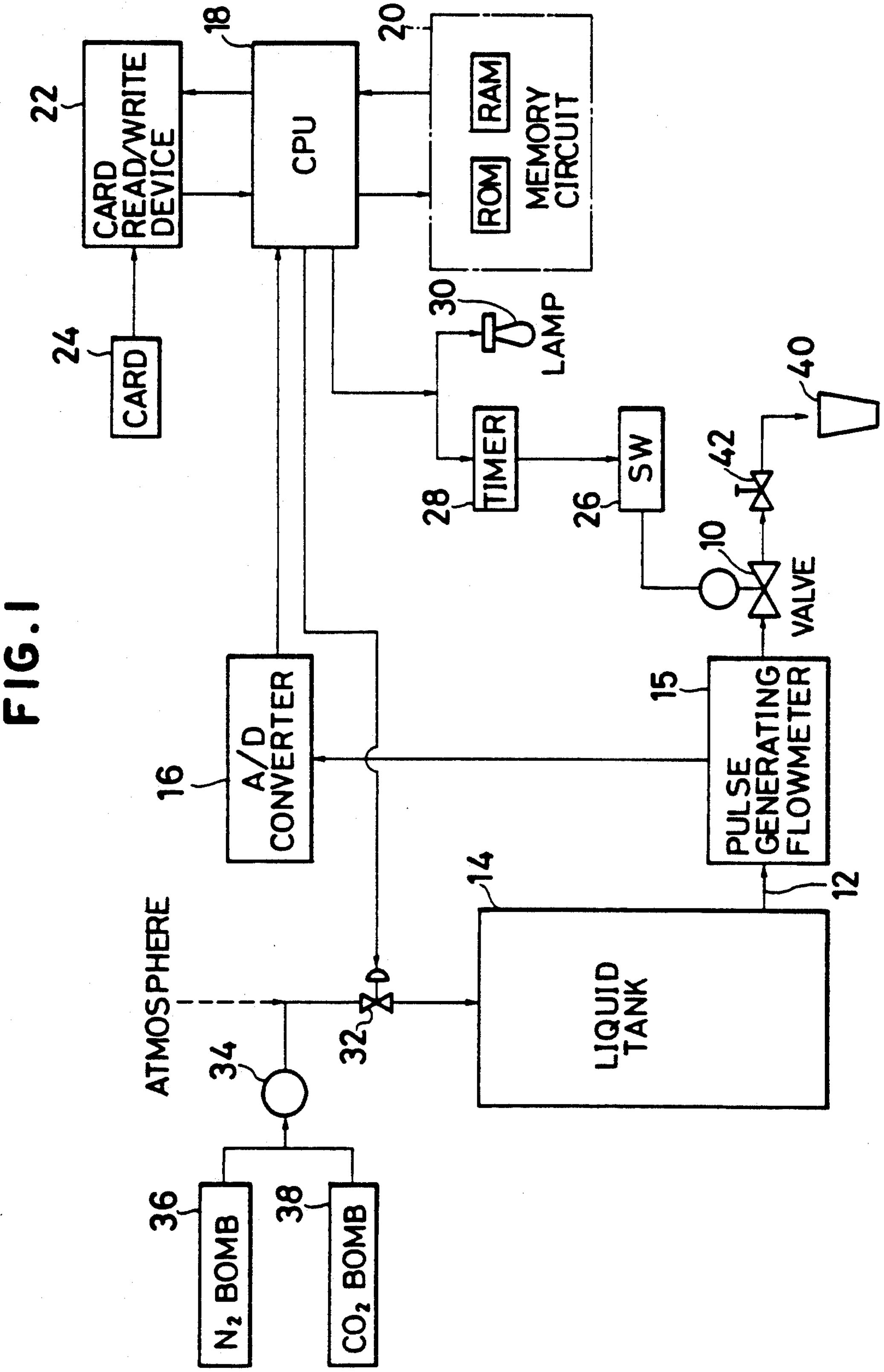
FIG. 1 is a block diagram showing an embodiment of a liquid dispensing apparatus according to the present invention.

FIG. 1 diagrammatically shows an embodiment of a liquid dispensing apparatus according to the present invention. A liquid dispensing apparatus of the illustrated embodiment includes a valve 10 provided in the middle of a feed passage or flow passage 12 such as a pipe led out from a lower portion of a liquid tank 14 in which liquid such as liquor or the like is stored. In the illustrated embodiment, liquor such as whiskey is stored in the liquid tank 14 and a solenoid valve may be used as the valve 10. The apparatus also includes a flowmeter 15 arranged at the flow passage 12. In the illustrated embodiment, the flowmeter 15 comprises a pulse generating flowmeter and is arranged between the liquid tank 14 and the valve 10. The pulse generating flowmeter 15 is adapted to generate a pulse signal proportional to the amount of liquid supplied from the tank 14 through the flow passage 12, which is then input to an A/D converter 16 which is adapted to convert the pulse signal to a digital electrical signal. The so-converted signal is then supplied to a CPU 18, which comprises a computer adapted to carry out predetermined operation based on various signals supplied thereto to generate an output signal. To the CPU 18 is connected a memory circuit 20 which includes a read on memory (ROM) and a random access memory (RAM). Also, to the CPU 18 is connected a card read/write device 22 which is adapted to carry out read and write of data such as the residue of liquid, a name of a customer and the like stored in a reloadable memory card 24 accessed thereto to supply a signal of the data obtained by the read and write to the CPU 18. The reloadable memory card 24 may comprise a magnetic card which is adapted to store data therein by magnetism. Alternatively, it may comprise a color card which is adapted to store data therein by color and causes its color to be changed when any variation of data occurs. The memory circuit 20 is adapted to store therein data of the memory card 24 which has been read out by the card read/write device 22.

The CPU 18 is connected to the valve 10 to operate or open it depending on data of the card read out by the card read/write device. For this purpose, it carries out operation or processing based on signals supplied thereto. In the illustrated embodiment, the valve 10 is connected to the CPU 18 through a switch 26 of which on-off control is carried out by the CPU 18 to operate the valve 10 and a timer 28 in order. To the CPU 18 may be also connected a lamp 30 in parallel to the timer 28. Alternatively, operation of the valve 10 may be manually carried out.

To a top of the liquid tank 14 is connected a valve 32 which is communicated to a pressure source or an ambient atmosphere. The valve 32 may be also connected through a pressure adjusting valve 34 to at least one non-oxidizing pressure or atmosphere source. In the illustrated embodiment, two such non-oxidizing gas sources or an $N_2$ bomb 36 and a $CO_2$ bomb 38 are connected through the pressure adjusting valve 34 to the valve 32. Further, the valve 32 is connected to the CPU 18 so that it may be operated depending on an output of the CPU 18. It is preferable that the liquid tank 14 is provided therein with a temperature control device (not shown) which serves to control a temperature of liquid in the tank 14 as desired.

Liquid supplied from a discharge end of the liquid feed passage 12 by operation of the valve 10 is received in a vessel such as a glass. In the illustrated embodiment, the flow passage 12 is also provided at a portion thereof between the valve 10 and the discharge end of the passage 12 with a manually operated valve 42 which is operated when the valve 10 gets out of order.

Now, the manner of operation of the liquid dispensing apparatus of the illustrated embodiment will be described hereinafter with reference to FIGS. 1 to 3.

Figure 2:
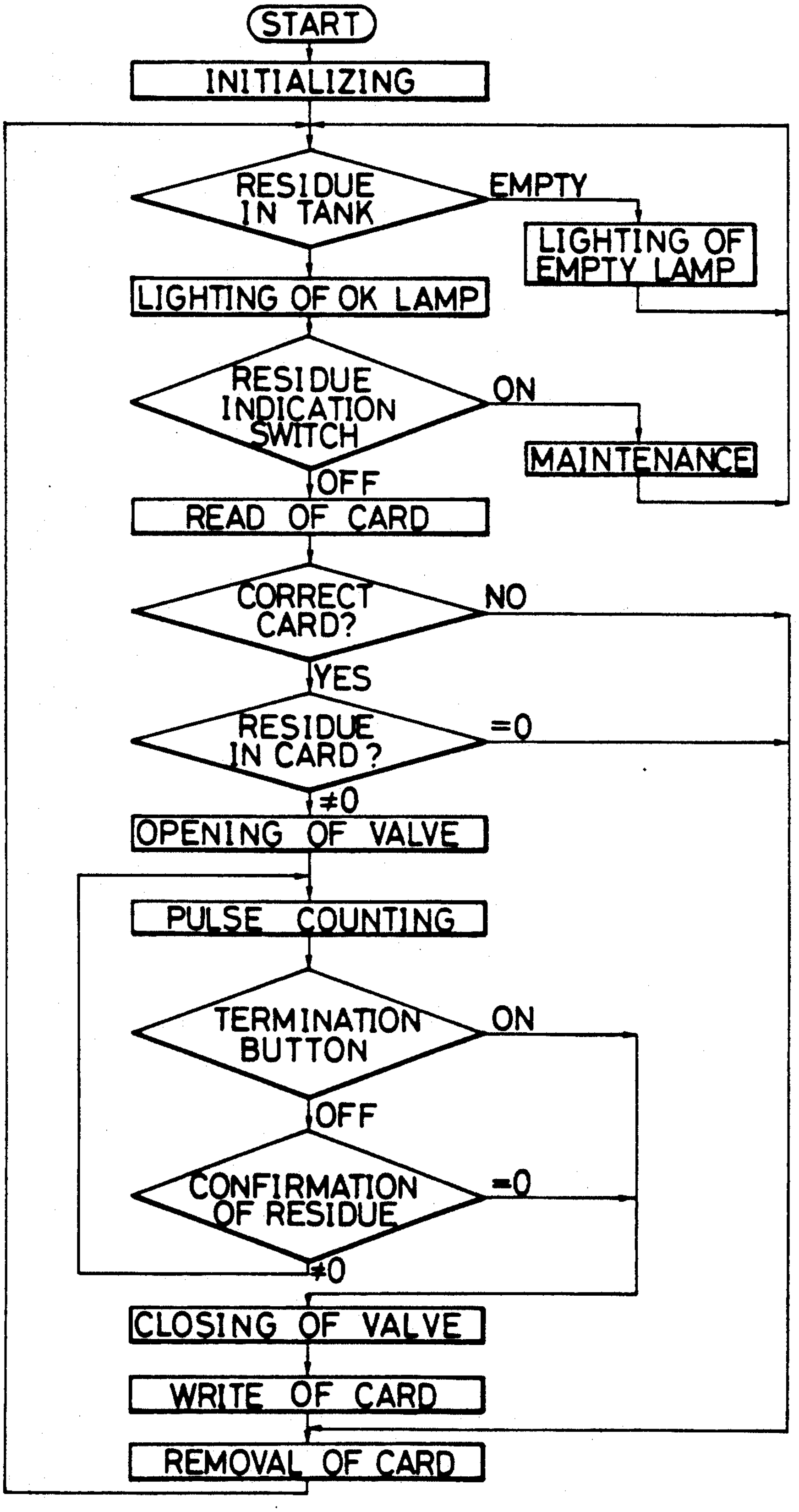
FIG. 2 is a flow chart showing operation of the liquid dispensing apparatus shown in FIG. 1.
Figure 3:
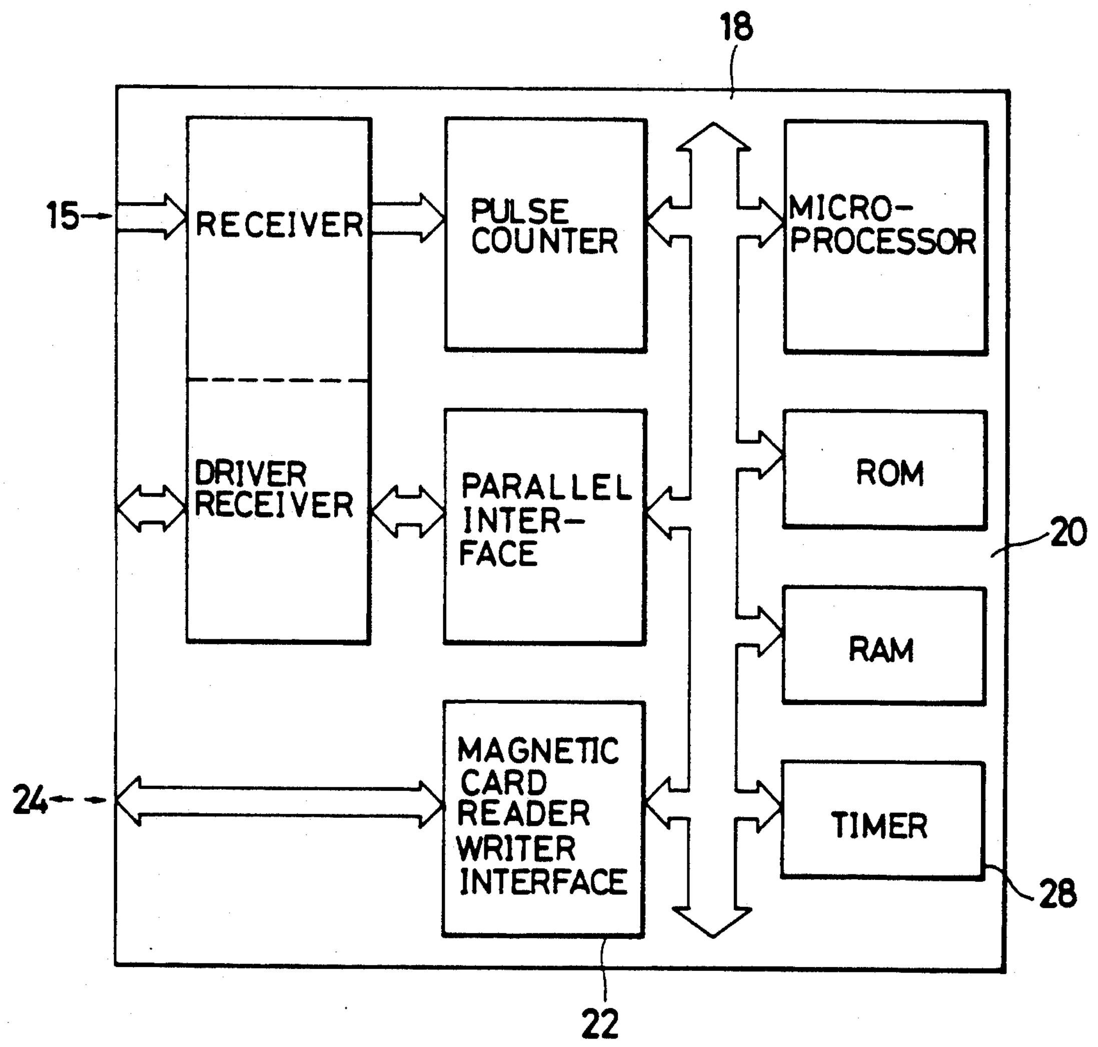
FIG. 3 is a block diagram showing operation of a CPU.

When a customer or an owner of the memory card 24 who purchased liquor in the form of the card requests to have a desired amount of liquor in a restaurant equipped with the liquid dispensing apparatus, the liquid dispensing apparatus is turned on as shown in FIG. 2, so that the residue of liquor in the liquid tank 14 is checked by a detector (not shown). When the tank 14 is empty, an empty lamp (not shown) is lighted and liquor is introduced in the tank. When the tank 14 is filled with liquor, an OK lamp (not shown) is lighted to turn a residue display switch (not shown) off.

Then, the magnetic card 24 is inserted into the card read/write device 22 and subjected to readout operation by the device 22 to lead to operation of the CPU 18, so that it makes an examination of the memory card 24 based on data such as the residue of liquor and the like stored in the card. When any error or defect is found in the examination, the memory card 24 is immediately discharged from the device 22. When the card passes the examination, data of the card 24 is stored in the memory circuit 20 and the CPU 18 operates to turn on the valve 10, valve 32 and pulse generating flowmeter 15 based on the data stored in the circuit 20, resulting in the valve 32 being opened and valve 10 and pulse generating flowmeter 15 being in a standby state.

When the valve 32 is opened, atmospheric pressure is applied to liquor in the tank 14 to cause it to be discharged from the tank through the feed passage 12 to the vessel 40. When it is not desired that liquid in the tank is exposed to oxygen, $N_2$ may be introduced from the $N_2$ bomb 36 through the pressure adjusting valve 34 to the tank 14. Alternatively, it is desired to saturate liquid with $CO_2$ gas, the tank 14 is communicated with the $CO_2$ bomb 38 through the valve 34.

Then, when the valve 10 is opened, liquor in the tank 14 is caused to flow from the tank through the feed passage 12 to the vessel 40; and when a desired amount of liquor is poured in the vessel, the valve 10 is closed. At this time, the pulse generating flowmeter 15 determines the amount of liquor flowing through the passage 12 to the vessel 40 to generate a pulse signal depending on the amount of the liquid, which is then supplied to the A/D converter 16. The converter 16 converts the signal into an electrical signal, which is then input to the CPU 18.

The CPU 18 subtracts the amount of liquor measured by the flowmeter 15 from the residue of liquor stored in the memory card 24. Then, when the card is a magnetic card, previous data stored in the card are eliminated by erasure of the data; whereas when it is a color card, color of the card is changed. This results in the latest data being stored in the magnetic card. Such operation of the CPU may be carried out in a manner to accumulate signals obtained from opening of the valve 10 to its closing and carry out erasure of the previous data or change in color of the card. When the CPU 18 completes its operation, the card read/write device 22 carries out write operation with respect to the memory card 14 and then the card 24 is removed from the device 22. Concurrently, the valve 10 and pulse generating flowmeter 15 are turned off. FIG. 3 illustrates one example of such operation by the CPU.

The signal of the amount of liquor flowing through the flow passage 12 which is supplied through the A/D converter 16 to the CPU 18 may be utilized for recording the total cumulative amount of liquor dispensed as desired.

As described above, the liquid dispensing apparatus of the illustrated embodiment utilizes a memory card which a customer purchases in place of directly purchasing liquor in the unit of a bottle and in which data such as the amount of liquor purchased and the like are stored to dispense a desired amount of liquor from the central feed tank according to a customer's request, therefore, the apparatus eliminates a necessity of storing a number of bottles in a restaurant and troublesome management of the bottles requiring time and labor. Also, the customer can commonly get good service at restaurants so long as they are equipped with the liquid dispensing apparatus.

As can be seen from the foregoing, the present invention allows a customer to be commonly provided with a desired amount of liquid in various places so long as they are equipped with the liquid dispensing apparatus of the present invention.

The above description has been made mainly in connection with dispensing of liquor, however, the present invention is not limited to liquor. The present invention is applied to dispensing of various kinds of liquid.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A liquid dispensing apparatus comprising:

a valve arranged at a flow passage led out from a liquid tank in which liquid is stored;

a flow meter provided at said flow passage to generate a signal proportional to the amount of liquid supplied through said flow passage;

a reloadable memory card in which data necessary for dispensing liquid is stored wherein said data is proportional to an amount of liquid available;

a card read/write device in which said reloadable memory card is inserted, said card read/write device carrying out read and write of data with respect to said reloadable memory card; and a CPU connected to said card read/write device and flow meter for opening said valve depending on data of said reloadable memory card read out by said card read/write device and receiving said signal from said flow meter to operate the amount of liquid passing through said passage, to thereby close that valve when either a desired amount of liquid is supplied or said amount of liquid supply through said flow passage as reflected by said proportional signal exceeds said amount of liquid available as reflected by said date;

said card read/write device carrying out writing of new data with respect to said memory card based on said operation of said CPU.

2. A liquid dispensing apparatus as defined in claim 1, wherein said reloadable memory card is a magnetic card.

3. A liquid dispensing apparatus as defined in claim 1, wherein said reloadable memory card is a color card which is varied in color depending on data stored therein.

4. A liquid dispensing apparatus as defined in claim 1, wherein said flowmeter is a pulse generating flowmeter.

5. A liquid dispensing apparatus as defined in claim 4, wherein said flowmeter is connected to said CPU through an A/D converter.

6. A liquid dispensing apparatus as defined in claim 1, wherein said CPU includes a memory circuit which stores therein data read out by said card read/write device.

7. A liquid dispensing apparatus as defined in claim 1, wherein said CPU is connected to said valve through an ON-OFF switch which is controlled by said CPU to operate said valve.

8. A liquid dispensing apparatus comprising:

a liquid tank for storing liquid therein, said liquid tank being communicated to a pressure source for applying pressure liquid in said liquid tank when liquid is to be dispensed;

a flow passage connected to said liquid tank to feed liquid therethrough;

a valve arranged at said flow passage;

a flow meter provided at said flow passage to generate a signal proportional to the amount of liquid supplied through said flow passage;

a reloadable memory card in which data necessary for dispensing liquid is stored wherein said data is proportional to an amount of liquid available;

a card read/write device in which said reloadable memory card is inserted, said card read/write device carrying out read and write of data with respect to said reloadable memory card;

a CPU connected to said card read/write device and flow meter for receiving data of said memory card from said card read/write device to open said valve depending on said data and receiving said signal from said flow meter to operate the amount of liquid passing through said flow passage, to thereby close said valve when either a desired amount of liquid is supplied or said amount of liquid supplied through said flow passage as reflected by said proportional signal exceeds said amount of liquid available as reflected by said data; and a memory circuit connected to said CPU for storing therein data of said memory card read out by said card read/write device;

said card read/write device carrying out writing of new data with respect to said memory card based on said operation of said CPU.

9. A liquid dispensing device as defined in claim 8, wherein said pressure source is an ambient atmosphere.

10. A liquid dispensing device as defined in claim 8, wherein said pressure source comprises a non-oxidizing gas source.

11. A liquid dispensing device as defined in claim 8, said pressure source comprises one of an ambient atmosphere and a non-oxidizing gas source.

* * * * *